United States Patent [19]

Krause et al.

[11] Patent Number: 5,757,372

[45] Date of Patent: May 26, 1998

[54] MULTIPLE NONLINEAR UNDO BUTTONS

[76] Inventors: Kai Krause, 601 Cowles Rd., Montecito, Calif. 93108; Ben Weiss, 6303 Carpinteria Ave., Carpinteria, Calif. 93013

[21] Appl. No.: 588,063

[22] Filed: Jan. 16, 1996

[51] Int. Cl.$^6$ .................................................. G06F 3/14
[52] U.S. Cl. .................. 345/348; 345/339; 395/619; 395/772
[58] Field of Search .................. 395/619, 620, 395/772, 326, 334, 339, 348, 349, 352, 354

[56] References Cited

U.S. PATENT DOCUMENTS

| | | | |
|---|---|---|---|
| 5,159,669 | 10/1992 | Trigg et al. | 395/357 |
| 5,357,631 | 10/1994 | Howell et al. | 395/619 |
| 5,438,661 | 8/1995 | Ogawa | 395/346 |
| 5,546,528 | 8/1996 | Johnston | 395/344 |
| 5,619,700 | 4/1997 | Abe | 395/703 |

OTHER PUBLICATIONS

Adobe Photoshop User Guide, Adobe Systems Incorporated, Version 2.5 for Macintosh, 1993, pp. 135–136.

*Primary Examiner*—Mark R. Powell
*Assistant Examiner*—U. Chauhan
*Attorney, Agent, or Firm*—Blakely Sokoloff Taylor & Zafman

[57] ABSTRACT

A method and an apparatus for saving prior versions of a document so that the user has complete control of which versions of the document are saved, while providing a mechanism for easy retrieval of saved versions. The invention utilizes a set of icons on a screen display which when selected by a pointer device perform an action depending upon the state of the selected icon which may be one of three states.

11 Claims, 2 Drawing Sheets

5,757,372

MULTIPLE NONLINEAR UNDO BUTTONS

BACKGROUND OF THE INVENTION

1. Field of the Invention

The invention is in the field of computer software used to create documents such as text documents created by a word processor, graphics documents created by draw or paint programs, spread sheets created by spread sheet programs, or the like.

2. Description of the Related Art

As a document is being created by a user using computer software, as changes are being made, the document, which is generally stored in volatile memory, must be saved to a more permanent memory such as a hard disk. This is necessary because until a document is saved to the more permanent memory, all changes made which exist only in the volatile memory are subject to being lost in the event of a hardware or software error which causes the computer to freeze making it impossible to save changes which exist only in the volatile memory.

To address this problem, some programs have the ability to automatically save a document a user is working on at a user-selected interval such as every five minutes. Other programs have what is known as an undo feature enabling a user to undo a modification which has just been made. The undo feature can be implemented so that, in effect, each time a change of a predetermined type is made, the version of the document which existed just prior to that change is automatically saved.

Another technique which is sometimes employed is to save different versions of a document under a slightly altered name such as by appending a version number (e.g., 1, 2, 3, etc.) to the file name. This can be done automatically at preset intervals or by the user causing a save operation to be initiated.

However, in all such prior art systems, the saved version of the document is linear in nature. That is, if an undo command is executed, the document reverts to the immediately prior state. If multiple undo capability is provided, then the document proceeds through its prior states in a linear manner. Similarly, when changes are saved by version number, the user can usually easily only get back to the immediately prior version. If multiple versions are saved, then the user must execute a command which causes a list of prior versions to be displayed from which the user can select one prior version to open to replace the current version stored in volatile memory.

SUMMARY OF THE INVENTION

A method and an apparatus are disclosed for saving prior versions of a document so that the user has complete control of which versions of the document are saved, while providing a mechanism for easy retrieval of saved versions. The invention utilizes a set of icons on a screen display which when selected by a pointer device perform an action depending upon the state of the selected icon which may be one of three states.

DETAILED DESCRIPTION OF THE INVENTION

A method and apparatus are disclosed which provide a mechanism for enabling a user of a computer program to save multiple versions of a document being worked on such that the current version can be easily saved and prior versions can be easily and selectively retrieved.

The mechanism is implemented as a computer program which displays a set of icons on a display device, which icons, when selected by a user by operation of a pointing device, cause a predetermined action to be taken with respect to the image currently displayed on the visual display. The image being displayed may represent any kind of a document such as a scanned picture in a bitmapped format, a word processing document, a spreadsheet document or any other type of document which may be represented on a computer screen.

Figure 1:
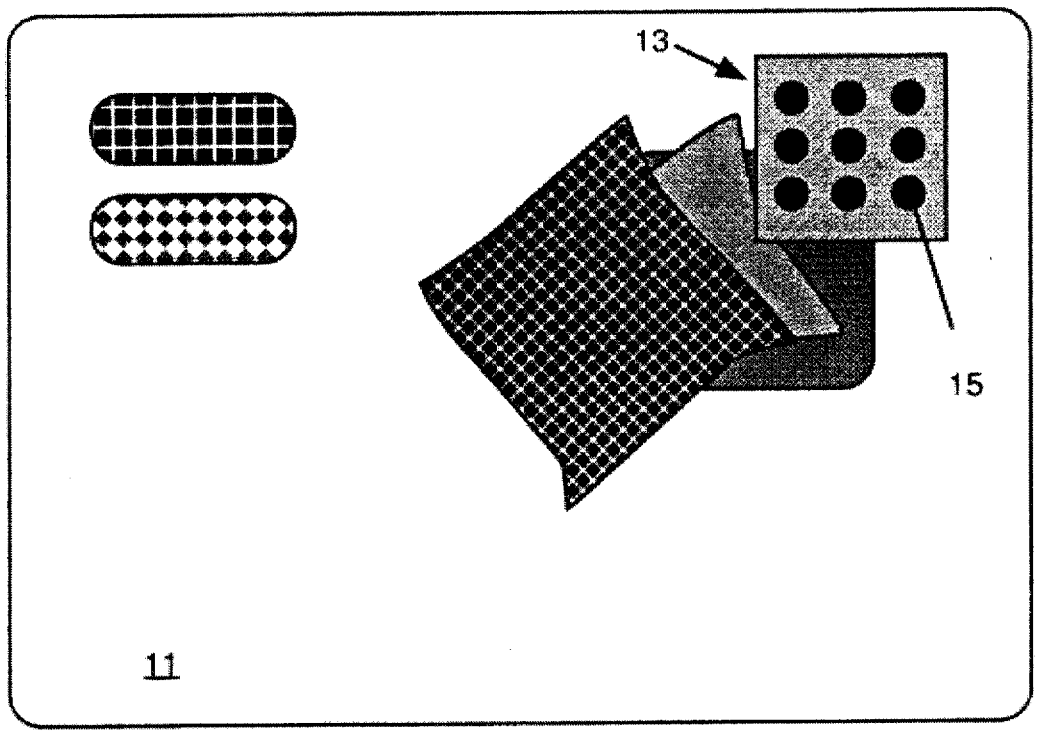
FIG. 1 is a view of a typical screen display showing screen icons of the type used in the present invention to save multiple versions of a document for easy retrieval.

For example, referring to FIG. 1, an image is shown on a display device 11. In the upper right hand corner of the image is an icon formed by a palette 13 and set of buttons or dots 15. The palette 13 is what is known in the art as a floating palette meaning that it appears in a window on the display which is never hidden by the image of the document currently being worked on by the user. The palette may be moved around the screen, and when it is moved, the image which had been underneath the palette is redrawn and a portion of the image underneath the new position of the palette is replaced by the image of the palette. Techniques for implementing floating palettes of this type are well known in the art, and therefore, will not be further described herein.

The buttons or dots 15 are the icons which when selected by the user cause the current state of the document to be saved or replaced by a previously saved version of the image depending upon the state of the selected button or dot 15. In FIG. 1, the buttons 15 are shown as an array of three rows of horizontal dots and three columns of vertical dots. Thus, in the array shown in FIG. 1, a total of nine versions of a document may be saved for later retrieval. More or less dots could be used without departing from the scope of the invention, however, it has been determined that an array of nine dots, or nine potential memory locations to save to, is a useful number since it can be difficult for a user to remember more than nine save versions of a document, and having the capability of saving less than nine versions reduces the flexibility that a user has to retain saved versions for possible subsequent retrieval.

In this connection, typical use for the present invention is in applications wherein the documents being created are in the nature of pictures or drawings wherein a user is able to produce various effects on the displayed image by operation of the application program and, while seeking to determine a particularly pleasing effect, may produce a set of images which if not saved would be difficult to reproduce. For example, some graphics oriented programs have the capability of applying filtered effects to a displayed image, and it frequently is difficult to determine in advance what effect operation of a particular filter will have on the displayed image.

Figure 2A:
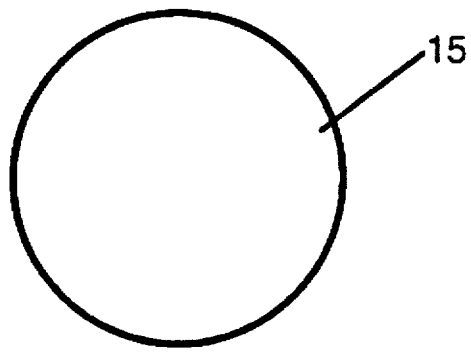
FIG. 2a is a view showing one of the buttons 15 in a first state.
Figure 2B:
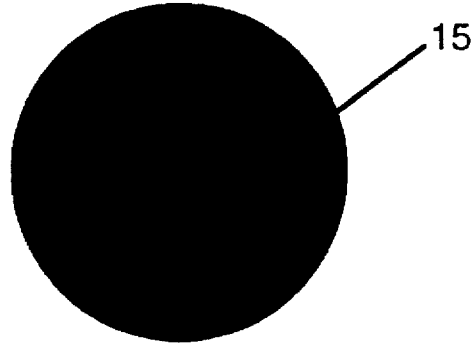
FIG. 2b is one of the buttons 15 in a second state.
Figure 2C:
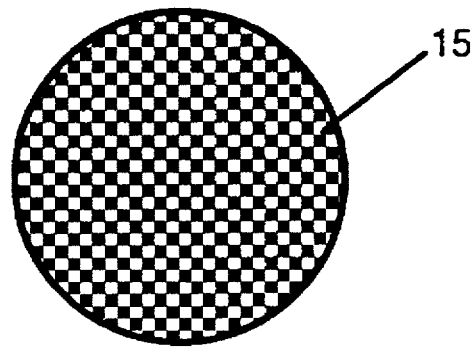
FIG. 2c is one of the buttons 15 in a third state.

According to the present invention, each of the dots in palette 13 represents one of three states. The first state is "empty" meaning no image has been saved in a memory corresponding to that dot. The second state is "saved"

meaning a version of the document has been previously saved in a memory location corresponding to that dot. The third state is "current" meaning a previously saved version of the document corresponding to that dot has been loaded into the volatile memory and is currently displayed. Typically, the state of a dot may be determined by its color. For example, the empty state may be represented by gray, the saved state represented by brown, and the current state represented by red. Of course, other colors could be used to represent the three states, or, alternatively, in a monochrome display, three different patterns may be used, such as white for empty, black for saved and a black and white pattern for current as shown in FIGS. 2a, 2b and 2c, respectively.

Additionally, it should be noted that the portion of the document which is saved is implementation dependent and the saved image may be just the differences from a prior state, or it may be the entire document in its updated state. Further, the memory to which the image (or differences from prior image) may be any volatile memory or more permanent memory. While volatile memory would produce faster save and load operations, additional relatively expensive random access memory would be needed and there would be an increased risk of loss of work in the event of system failure. A more permanent memory such as a hard disk could be used, however, this would result in slower load and save operations.

Logically, selection of dots or buttons 15 causes the following operations to be performed. If a button is in the empty state, selecting that button will cause a save operation to take place with respect to the currently displayed image and the selected button or dot will change so that it is displayed in the saved state (e.g., brown or black). If the button or dot is in the saved state when it is selected, then the displayed image is replaced with the image corresponding to the memory of the selected memory button, and the display of the selected button is changed to show a change of state to current (e.g., red or black and white pattern). If the selected button or dot is in the current state then no action is taken.

The implementation details for performing the above-noted operations should be readily apparent to persons skilled in the art using well known techniques. In general, the invention would be implemented as a module or set of modules in an application program which performs desired operations on the document or displayed image. The invention simply provides an additional capability of saving versions of a document as it is being worked on in a manner which simply and elegantly allows the user to save and retrieve multiple versions of the document being worked on.

What is claimed is:

1. A computer implemented method for enabling a user to save and retrieve multiple versions of a document comprising the steps of:

a) displaying an array of buttons on a displayed image of a document being modified, wherein each button in said array is in one of three states as indicated by a visual appearance of said buttons, said three states being user selectable and being one of empty, saved and current;

b) if the state of a button selected by a user is empty, saving a copy of the displayed image in a predetermined memory corresponding to said selected button and changing the state of the selected button to saved;

c) if the state of the button selected by a user is saved, replacing the displayed image with a copy of an image previously saved in a predetermined memory corresponding to said selected button and changing the state of the selected button to current;

d) if the state of the button selected by a user is current, taking no action as a result of said selection.

2. The method defined by claim 1 wherein said predetermined memory is a volatile memory.

3. The method defined by claim 1 wherein said predetermined memory is a permanent memory.

4. The method defined by claim 1 wherein said array of buttons form a palette.

5. The method defined by claim 4 wherein said palette is a floating palette.

6. The method defined by claim 1 wherein said array of buttons is arranged as an array having an equal number of columns and rows.

7. The method defined by claim 6 wherein said array has three rows and three columns.

8. The method defined by claim 1 wherein a button in the empty state has a first color visual appearance, a button in the saved state has a second color visual appearance and a button in the current state has a third color visual appearance.

9. The method defined by claim 8 wherein said first color is gray, said second color is brown and said third color is red.

10. The method defined by claim 1 wherein a saved version of a document contains all elements of the document which has been saved.

11. The method defined by claim 1 wherein a saved version of a document contains only changed elements of the document which had previously been saved.

* * * * *